United States Patent [19]

Olson, II

[11] Patent Number: 4,693,698
[45] Date of Patent: Sep. 15, 1987

[54] COMPOSITE ROLLER FOR THE TRIPOD OF A FREE-PLUNGING CONSTANT VELOCITY UNIVERSAL JOINT

[75] Inventor: Dean A. Olson, II, Rockford, Ill.

[73] Assignee: Rockford Acromatic Products Co., Rockford, Ill.

[21] Appl. No.: 321,450

[22] Filed: Nov. 16, 1981

[51] Int. Cl.[4] ............................................. F16D 3/20
[52] U.S. Cl. .................................... 464/111; 464/124; 464/132; 464/905
[58] Field of Search ............... 464/106, 111, 120, 122, 464/123, 124, 132, 905, 902; 148/39, 152; 308/208, 241, 216, DIG. 8

[56] References Cited

U.S. PATENT DOCUMENTS

| | | | |
|---|---|---|---|
| 2,259,324 | 10/1941 | Robinson | 29/148.4 |
| 3,613,396 | 10/1971 | Drevard et al. | 464/111 X |
| 3,677,032 | 7/1972 | Suzuki | 464/902 X |
| 3,737,204 | 6/1973 | Burkhardt | 308/241 |
| 4,017,708 | 4/1977 | Engel et al. | 148/39 X |
| 4,108,689 | 8/1978 | Peter et al. | 308/241 X |
| 4,224,806 | 9/1980 | Kobayashi | 464/111 X |
| 4,279,528 | 7/1981 | Mangiavacchi et al. | 403/57 |
| 4,293,171 | 10/1981 | Kakumoto | 308/241 X |

FOREIGN PATENT DOCUMENTS

| | | | |
|---|---|---|---|
| 1394228 | 5/1975 | United Kingdom | 464/111 |
| 1454693 | 11/1976 | United Kingdom | 464/111 |

OTHER PUBLICATIONS

Laser Hardening, Manufacturing Engineering, Jun. 1976, Charles Wick, pp. 35-37.
Universal Joint and Driveshaft Design Manual (1979), pp. 64, 66, 71 and 131-140.
Glaenzer Spicer Tripod Joints (Jun. 1979), pp. 1-16.

Primary Examiner—Daniel P. Stodola
Attorney, Agent, or Firm—Leydig, Voit & Mayer, Ltd.

[57] ABSTRACT

A free-plunging constant velocity joint of the tripod type in which rollers are disposed in rolling engagement with the tracks of a tulip member and are rotatably and slidably supported by needles on the trunnions of a tripod. Each roller has an outer bearing surface and an inner bearing surface, the hardness of the outer bearing surface being less than the hardness of the inner bearing surface and less than the hardness of the tracks in order to reduce accelerated wear of the tracks as the roller rolls back and forth on the tracks.

3 Claims, 8 Drawing Figures

COMPOSITE ROLLER FOR THE TRIPOD OF A FREE-PLUNGING CONSTANT VELOCITY UNIVERSAL JOINT

BACKGROUND OF THE INVENTION

This invention relates generally to a free-plunging constant velocity universal joint of the tripod type for connecting a first rotatable shaft to a second rotatable shaft which is inclined at a designed joint angle relative to the first shaft. Constant velocity joints of this type are well known and have long been manufactured and sold, for example, by Glaenzer Spicer of Poissy, France.

In general, a free-plunging constant velocity joint of the tripod type comprises an outer housing or tulip-shaped member connected to one of the shafts and formed with three angularly spaced branches which are separated by angularly spaced slots. A tripod is rotatable with the other shaft and is formed with three angularly spaced trunnions which project radially into the slots of the tulip member. A roller is rotatably and slidably supported on each trunnion by an annular row of needles.

Each roller of the tripod is tubular and includes an inner bearing surface and an outer bearing surface. The inner bearing surface of each roller is generally cylindrical and bears against the needles. The outer bearing surface of each roller is spherically shaped and rides against tracks defined by opposing sides of adjacent branches of the tulip member.

The tulip member and the tripod coact to transmit motion between the inclined shafts with constant angular velocity and to allow relative axial movement or plunging of the shafts. As the tripod turns, its rollers slowly rotate about their own axes and oscillate on the tracks of the tulip member. Such oscillation causes the tracks to wear and eventually creates depressions in the tracks. When axial plunging occurs, the rollers roll out of and then back into the depressions and, if the tracks are badly worn so that the depressions are relatively deep, abrupt and unacceptable jerking is produced each time the rollers leave and return to the depressions. Accordingly, track wear is a factor which significantly affects the service life of the joint. The wear is greater when the shafts are inclined at small joint angles than when the shafts are inclined at large joint angles because there is a higher ratio of contact area between the rollers and the tracks at small joint angles.

SUMMARY OF THE INVENTION

The general aim of the present invention is to reduce the wear imposed on the tracks of the universal joint so as to enable the joint to experience a longer service life.

A more detailed object of the invention is to reduce accelerated track wear by reducing the abrasive cutting action applied to the tracks by the outer bearing surfaces of the rollers of the tripod as the rollers oscillate on the tracks. The solution to reducing accelerated track wear is based on my discover that certain surface characteristics of the inner and outer bearing surfaces of each roller should not be identical to one another and to the surface characteristics of the tracks but that indeed certain surface characteristics of the outer bearing surfaces should be different from and less demanding than those of the inner bearing surfaces and of the tracks so as to reduce the abrasive cutting action of the outer bearing surfaces on the tracks. In the preferred manner of carrying out my discovery, I provide a unique roller having an outer bearing surface whose hardness is less than the hardness of the inner bearing surfaces of the roller, is less than the hardness of the tracks and is less than the minimum hardness previously thought to have been necessary under actual operating conditions. Being of reduced hardness, the outer bearing surfaces of the roller cuts into the tracks less severely and thus the universal joint may operate for a longer period of time before the track depressions becomes unacceptably deep. At the same time, the hardness of the inner bearing surfaces of the roller is kept sufficiently great to meet the design demands of the inner bearing surface. Also, the hardness of the tracks is left at such a value as to enable the use of standard materials and manufacturing techniques for the tulip member.

I have further discovered that the hardness of the outer bearing surface of each roller should be determined as a function of the joint angle. If the joint angle is small as in most front wheel automotive drive applications, the hardness of the outer bearing surfaces should be reduced further than is the case when the shaft angle is high and the tracks are subjected to less severe wear.

In addition to reducing the hardness of the outer bearing surface of each roller, the surface finish of the bearing surface may be modified to reduce track wear even further. Generally speaking, the surface finish of the outer bearing surface should correspond as closely as possible with the surface finish of the tracks in order to reduce abrasive action between the roller and the tracks.

These and other objects and advantages of the invention will become more apparent from the following detailed description when taken in conjunction with the accompanying drawings.

DETAILED DESCRIPTION OF THE PREFERRED EMBODIMENT

Figure 1:
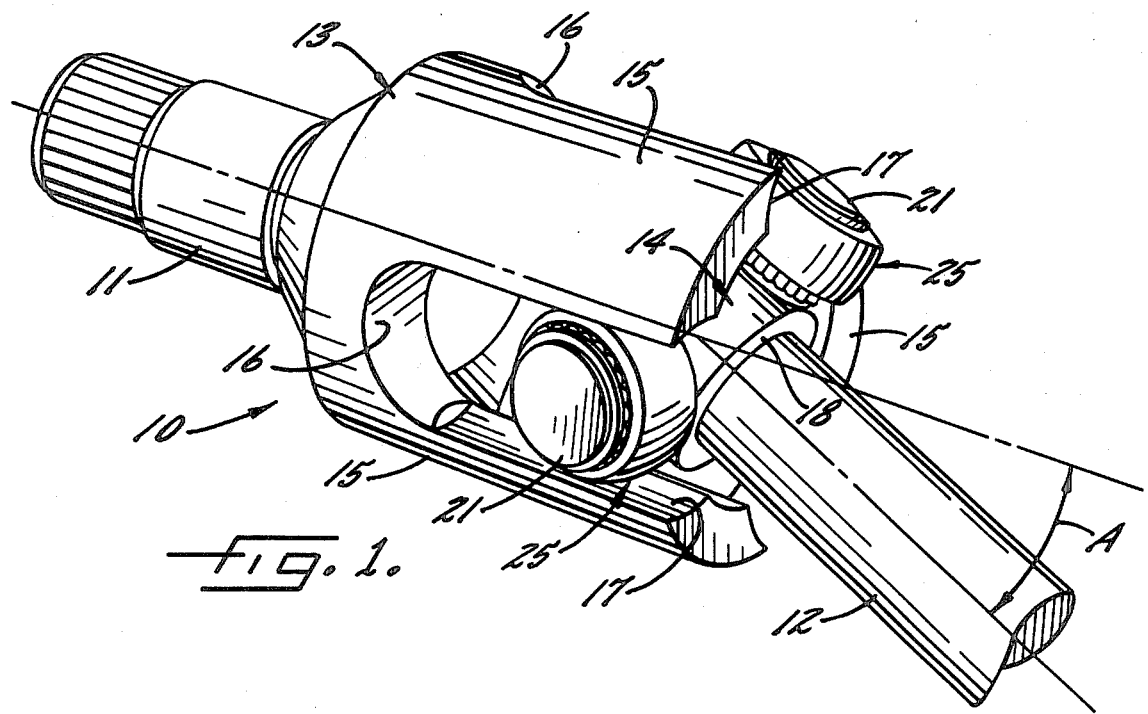
FIG. 1 is a perspective view of a free-plunging constant velocity universal joint having a tripod equipped with new and improved rollers incorporating the unique features of the present invention. For purposes of clarity, the shafts have been shown at an exaggerated joint angle in FIG. 1.
Figure 2:
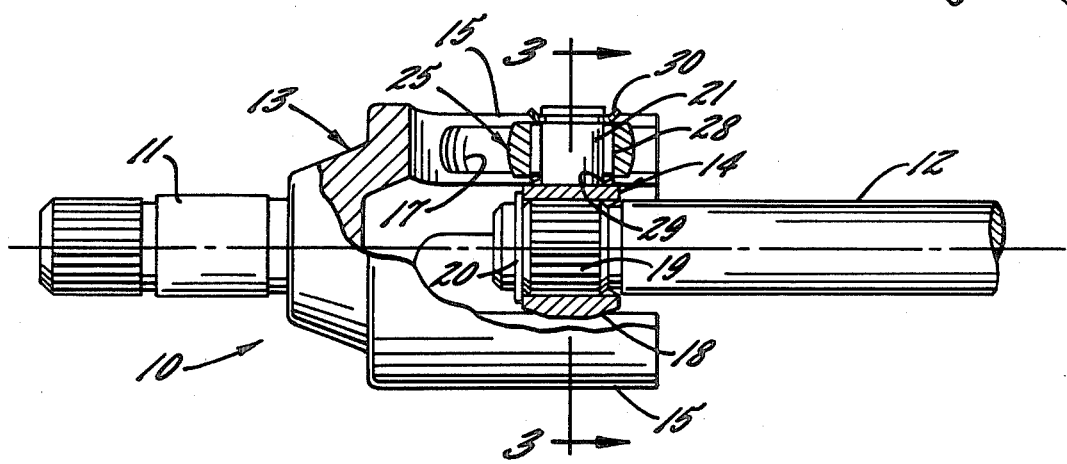
FIG. 2 is a side elevational view, on a reduced scale, of the universal joint shown in FIG. 1, certain parts of the joint being broken away and shown in section. For purposes of clarity, the shafts have been shown at a zero shaft angle in FIG. 2.
Figure 3:
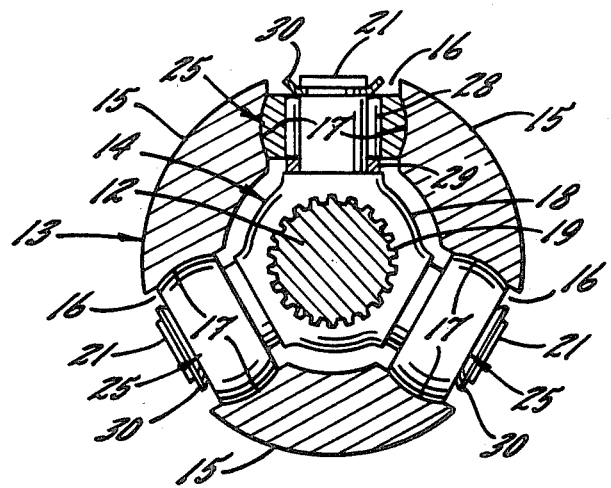
FIG. 3 is an enlarged cross-section taken substantially along the line 3—3 of FIG. 2.

As shown in the drawings for purposes of illustration, the invention is embodied in a free-plunging constant velocity universal joint 10 for drivingly connecting two rotatable shafts 11 and 12 which are inclined relative to one another at a predetermined joint angle A (FIG. 1). The joint 10 may, for example, be used in a front wheel automotive drive where the shaft 11 is a driving shaft and the shaft 12 is a driven shaft. In most front wheel automotive drives, the joint angle A usually is less than ten degrees but, for clarity of illustration, a larger joint angle has been shown in FIG. 1 while the shafts have been shown at a zero shaft angle in FIG. 2.

The purpose of the universal joint 10 is to transmit motion from the shaft 11 to the shaft 12 with constant angular velocity while permitting the shaft 12 to move or plunge axially relative to the shaft 11. The joint generally comprises two members, namely, a housing or tulip member 13 and a tripod member 14. In this instance, the tulip 13 is integral with the shaft 11 and comprises three angularly spaced petals or branches 15 which are separated by angularly spaced slots 16. Each side of each branch 15 is formed with a concave surface 17 which conforms to the inner surface of a cylindrical section and which defines an elongated track along the side of the branch.

The tripod 14 comprises an internally splined tubular hub 18 which receives a spline 19 (FIG. 2) on the shaft 12 and which is held in an axially fixed position thereon by a retaining ring 20. Three angularly spaced trunnions 21 are formed integrally with and extend radially from the hub. In the assembled joint 10, the trunnions project into the slots 16 between the branches 15 of the tulip 13.

Figure 5:
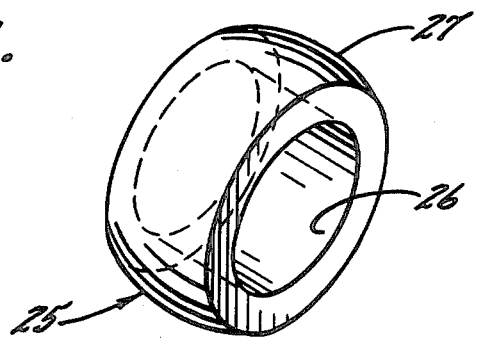
FIG. 5 is a perspective view of one of the rollers.

Telescoped over each trunnion 21 is a tubular roller 25 preferably made of steel and formed on an automatic screw machine from bar stock. Each roller includes an inner bearing surface or race 26 (FIG. 5) which is generally cylindrical and further includes an outer bearing surface or race 27 which is generally spherical in shape. Both ends of the roller are open.

Figure 4:
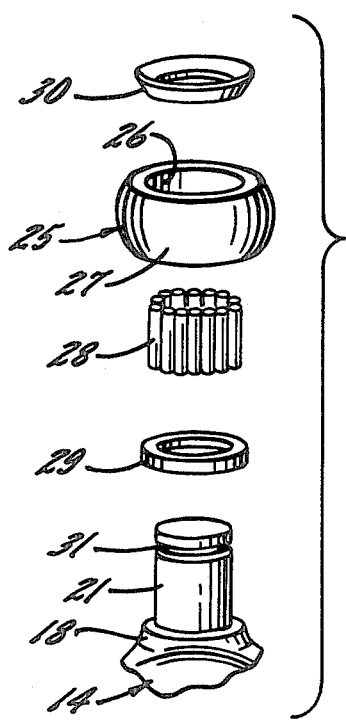
FIG. 4 is an exploded perspective view of a portion of the tripod.

Each roller 25 is rotatably and slidably supported on its trunnion 21 by an annular row of needles 28 (FIG. 4) whose inner ends engage a thrust washer 29 on the trunnion. A retaining ring 30 is snapped into a groove 31 around the outer end portion of each trunnion and captivates the roller and the needles on the trunnion. The needles bear against the inner race 26 of the roller and support the roller for rotation about the axis of trunnion. In addition, each roller is adapted to slide back and forth along the needles through a short axial stroke.

The outer race 27 of each roller 25 engages the tracks 17 defined by the opposing sides of adjacent branches 15 of the tulip 13. As the shafts 11 and 12 rotate, the rollers 25 turn about the axes of the trunnions 21 and roll on the tracks 17 with an oscillating motion. When the shaft 12 plunges axially relative to the shaft 11, the rollers roll back and forth along the tracks.

During normal rotation of the shafts 11 and 12 when the rollers 25 roll on the tracks 17 with an oscillating motion, each roller bears against its track and creates a compressive stress pattern which, at any given instant, is generally in the shape of a long narrow ellipse (FIG. 7) having a major dimension a transversely of the track and having a minor dimension b longitudinally of the track, the dimension a usually being at least twenty times as great as the dimension b. During each revolution of the shafts, the roller 25 causes this stress pattern to sweep longitudinally along the face of the track, first in one direction and then the other, through an area having a transverse dimension equal to a and having a longitudinal dimension which has been designated as W. In a typical joint where the effective radius of the joint is equal to twice the outside radius R of the roller, the dimension W can be estimated as $$W \approx 4R \sin A \tag{1}$$

where A is the joint angle. Reference may be made to pages 182 and 183 of the English version of *General Theory And Experiment Of Homokinetic Joints* (M. Orain) for a basic motion equation from which the above equation may be derived.

Figure 6:
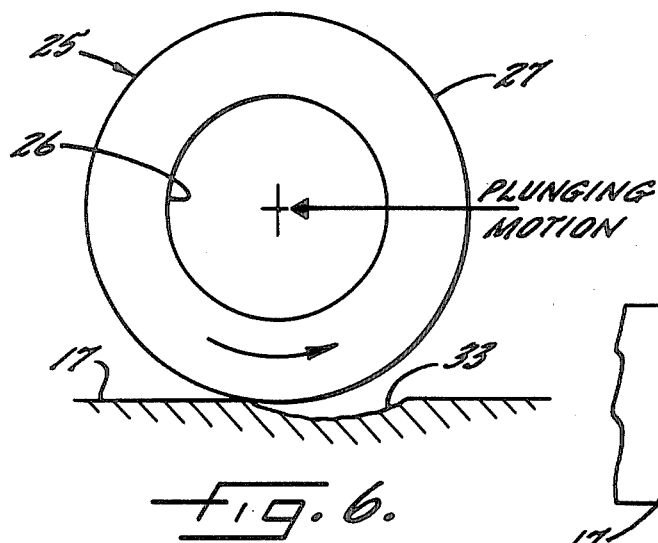
FIG. 6 is a diagrammatic view which shows a roller rolling out of a depression in one of the tracks of the tulip.

The rolling engagement of the rollers 25 with the tracks 17 causes the rollers and the tracks to wear and causes each roller to form a depression 33 (FIG. 6) in the adjacent track. When axial plunging of the shaft 12 occurs, the rollers ride out of and then fall back into the depressions. In cases where wear has caused the depressions to be relatively deep, abrupt and noticeable jerking occurs as the rollers roll out of and into the depressions. Track wear, therefore, is a significant factor which shortens the service life of the joint.

In accordance with the present invention, accelerated wearing of the tracks 17 is significantly reduced by making each roller 25 such that certain surface characteristics of the outer race 27 of the roller are different from and are less demanding than the corresponding surface characteristics of the inner race 26 and the tracks. Contrary to previous thinking, certain surface characteristics of the outer race need not be as rigorous as those of the inner race and the tracks and, by modifying the outer race, the abrasive cutting action of the roller on the tracks may be reduced so to extend the life of the joint 10.

The preferred manner of carrying out the invention is to make each roller 25 such that the hardness of the outer race 27 is less than the hardness of the inner race 26 and is less than the hardness of the tracks 17. In automotive applications, the tracks and the inner and outer races of the rollers previously have been hardened to the same degree and usually to at least a hardness of 60 Rockwell C. The inner race 26 of the present roller 25 conforms to conventional design standards and thus its hardness exceeds 60 Rockwell C. The hardness of the tracks 17 also exceeds 60 Rockwell C. The outer race 27, however, is hardened to a lesser degree of hardness with the particular degree of hardness being a function of the joint angle A as will become more apparent subsequently. The preferred range of hardness for the outer race is between approximately 50 and approximately 55 Rockwell C. At small joint angles A, however, there is a larger ratio of contact area between the rollers 25 and the tracks 17 than at large joint angles and thus more rapid track wear is experienced. With very small joint angles, therefore, it may be desirable to reduce the hardness of the outer race to a value below 50 Rockwell C. To prevent crushing of the outer race under the most favorable (i.e., ideal) conditions, the hardness of the outer race must be at least 40 Rockwell C. Accordingly, the hardness of the outer race 27 of the roller 25 of the invention may range from 40 to 55 Rockwell C although the preferred range is between 50 and 55 Rockwell C.

Induction hardening techniques may be used to harden the outer race 27 of each roller 25 to a lesser degree than the inner race 26. When utilizing such techniques, the roller is placed into an inductor heater to heat the outer race and then is appropriately quenched to impart the desired hardness to the outer race. Thereafter, the roller is telescoped over an induction heater to heat the inner race and then is subjected to a more raid quench so as to cause the inner race to be of greater hardness than the outer race. Alternatively, the outer race may be inductively hardened to a value above the desired hardness and then normalized and reduced in hardness by annealing the roller prior to inductively heating and then rapidly quenching the inner race. While carburizing techniques also may be used to effect differential hardening, it is necessary to mask each race while the other race is exposed to the carburizing atmosphere. Accordingly, differential induction hardening is preferred from the standpoint of manufacturing efficiency.

Figure 7:
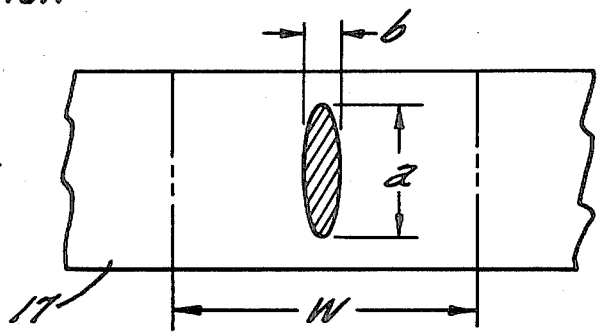
FIG. 7 is a diagrammatic view which shows the stress pattern created by virtue of roller bearing against the track.
Figure 8:
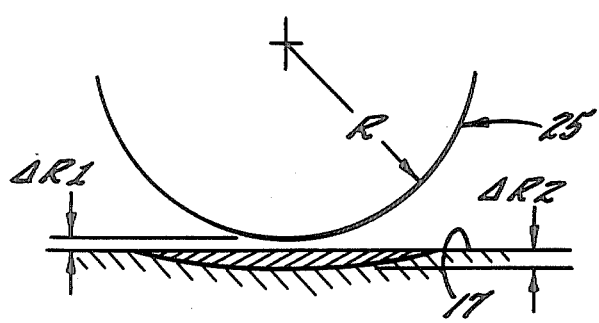
FIG. 8 is a diagrammatic view which shows the radial wear experienced by the roller and the track.

Reference is made to FIGS. 7 and 8 to demonstrate how the differential between the hardness of the inner and outer races 26 and 27 reduces track wear. FIG. 8 is a diagrammatic view which shows a roller wearing into a track. The symbol $\Delta R_1$ indicates the radial wear experienced by the roller 25 while $\Delta R_2$ indicates the radial wear experienced by the track 17.

As the roller 25 proceeds around the axis of the trunnion 21, the entire outer circumference of the roller is subjected to wear. Accordingly, the volume $V_1$ of material removed from the roller 25 by wear may be expressed approximately as:

$$V_1 \approx \Delta R_1(2\pi R)(a) \qquad (2)$$

where R is the outer radius of the roller and where a is the major dimension of the elliptical stress pattern shown in FIG. 7.

And, the volume $V_2$ of material removed from the track 17 by wear is approximated by:

$$V_2 \approx \Delta R_2(W)(a) \qquad (3)$$

where W is the longitudinal dimension of the area swept by the stress pattern (see FIG. 7).

When the track 17 and the outer race 27 of the roller 25 are of the same hardness as has been the practice heretofore, it is reasonable to assume that the volume of material removed from the roller by wear is approximately equal to the volume of material that is removed from the track by wear or that:

$$V_1 = V_2 \qquad (4)$$

Accordingly, one may assume that:

$$\Delta R_1(2\pi R)(a) \approx \Delta R_2(W)(a) \qquad (5)$$

which also may be expressed as:

$$\Delta R_2/R_1 = (2\pi R)/W \qquad (6)$$

And, by substituting for W the value set forth in equation (1), the ratio of radial wear of the track 17 ($\Delta R_2$) to radial wear of the roller 25 ($\Delta R_1$) may be expressed approximately as:

$$\Delta R_2/\Delta R_1 = \pi(2 \sin A) \qquad (7)$$

The wear ratio ($\Delta R_2/\Delta R_1$) is approximately 6 to 1 for a joint angle A of 15 degrees, is approximately 9 to 1 for a joint angle of 10 degrees and is approximately 18 to 1 for a joint angle of 5 degrees when the roller 25 and the track 17 are of equal hardness. A reduction in the hardness of the outer race 27 of the roller reduces the cutting action of the outer race on the track and reduces accelerated wearing of the track. When the joint angle A is in the neighborhood of 10 degrees, the hardness of the outer face should be within the range of 50 to 55 Rockwell C and should be reduced still further for smaller joint angles. With larger shaft angles, an outer race near the upper limit of the range may be tolerated. In all front wheel automotive drive applications, the hardness of the inner race 26 preferably should be at least 60 Rockwell C to satisfy stress and load requirements. The hardness of the tracks 17 also should be in the range of about 60 to 65 Rockwell C. While accelerated track wear could be reduced by increasing the hardness of the tracks significantly beyond about 65 Rockwell C, such an increase would require the tulip 13 to be made with different and more expensive materials and with different and more expensive manufacturing techniques than are presently employed.

In addition to the advantages gained by reducing the hardness of the outer face 27, track wear may be reduced further by modifying other surface characteristics of the outer race such as, for example, the surface finish. Most desirably, the surface finish of the outer race should correspond to the surface finish of the tracks 17 to reduce abrasive wear. Thus, the surface finish of the outer race should be correlated with the surface finish of the tracks and not necessarily with the surface finish of the inner race 26 as has been the case with prior rollers.

Each roller 25 may be described as a "composite" roller in that the outer race 27 is different from the inner race 26. The invention contemplates the provision of other types of composite rollers which need not necessarily be of single-piece construction. For example, the roller may be of laminated construction and may comprise an inner sleeve made of steel, brass or other metal and coated on its outer side with a different metal or with a polymer or other non-metallic material which forms the outer race and which is of reduced hardness to prevent accelerated track wear.

I claim:

1. A free-plunging constant velocity universal joint of the tripod type for connecting a first rotatable shaft to a second rotatable shaft which is inclined at a joint angle relative to said first shaft, said joint comprising a housing member rotatable with one of said shafts and having three angularly spaced branches separated by angularly spaced slots, the sides of said branches defining tracks, a tripod rotatable with the other of said shafts, said tripod having three angularly spaced trunnions which project radially into said slots, rollers on said trunnions and each having arcuate inner and outer bearing surfaces, each of said rollers being of single-piece construction and being made of steel, needles located between each trunnion and the inner bearing surface of the associated roller and supporting the roller for rotation and for back and forth sliding on the trunnion, the outer bearing surfaces of said rollers being disposed in rolling engagement with said tracks, said universal joint being characterized in that the hardness of the outer bearing surface of each roller is less than the hardness of the inner bearing surface of such roller and is less than the hardness of said tracks.

2. A universal joint as defined in claim 1 in which the hardness of each outer bearing surface is between 40 and 55 Rockwell C, in which the hardness of each inner bearing surface is at least 60 Rockwell C and in which the hardness of each track is between 60 and 65 Rockwell C.

3. A universal joint as defined in claim 2 in which the hardness of each bearing surface is between 50 and 55 Rockwell C.

* * * * *